May 8, 1956 W. M. CADY 2,745,098
ANTENNA STABILIZING APPARATUS
Filed May 30, 1945 3 Sheets-Sheet 1
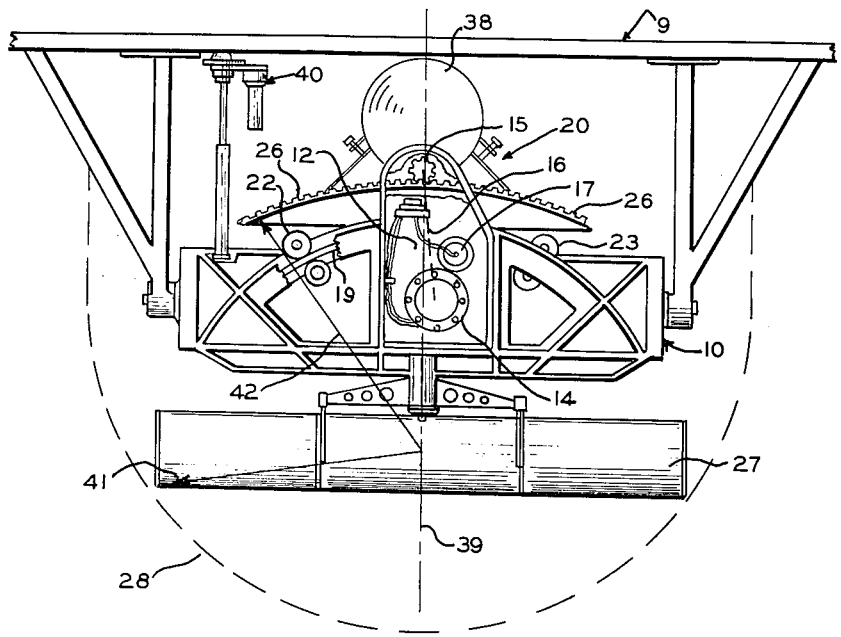
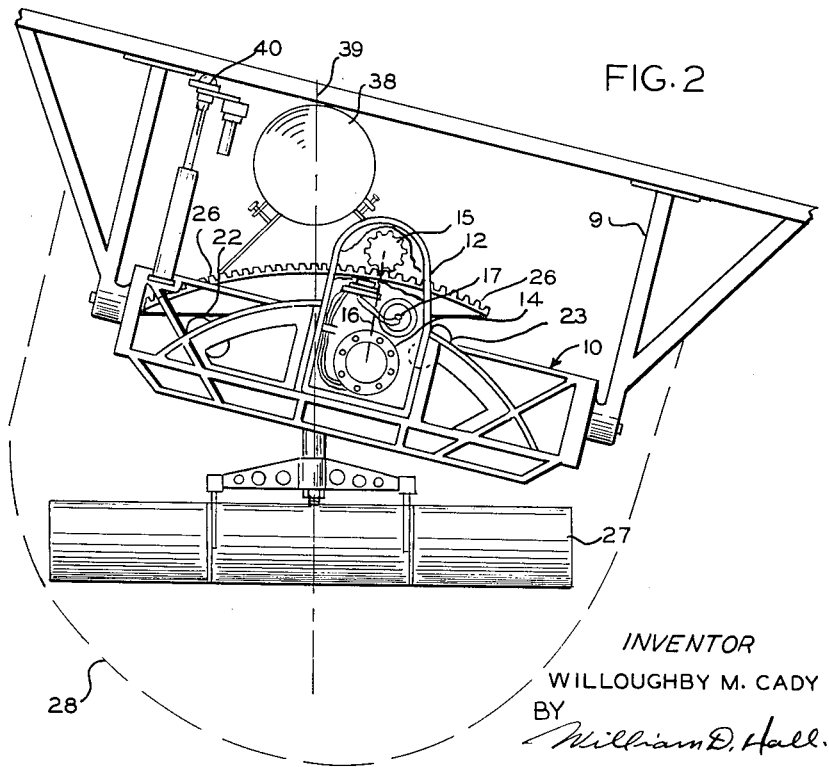
INVENTOR
WILLOUGHBY M. CADY
BY
William D. Hall.
ATTORNEY May 8, 1956     W. M. CADY     2,745,098
ANTENNA STABILIZING APPARATUS Filed May 30, 1945     3 Sheets-Sheet 2

INVENTOR
WILLOUGHBY M. CADY
BY William D. Hall,
ATTORNEY

United States Patent Office 2,745,098
Patented May 8, 1956

2,745,098
ANTENNA STABILIZING APPARATUS

Willoughby M. Cady, Cambridge, Mass., assignor, by mesne assignments, to the United States of America as represented by the Secretary of the Air Force Application May 30, 1945, Serial No. 596,723

1 Claim. (Cl. 343—100)

This invention relates to a stabilizing apparatus and more particularly to a stabilizing apparatus adapted for use with airborne radio object-locating equipment.

According to conventional practice, airborne radio object-locating equipment is rigidly mounted to an aircraft structure, and the equipment changes position and orientation when the aircraft deviates from level flight. As is well understood in the art, roll or bank of an aircraft may be produced as a result of evasive action during a radio objcet-locating operation. The roll of the aircraft, when the antenna of the object-locating equipment is attached to it in a conventional manner, changes the position of the radiation beam of the antenna with respect to the ground, and deviations are produced in the presentation on an indicator associated with the antenna. Thus, data obtained during the operation is impaired to the extent of such deviations.

Resort has been had to certain expedients heretofore in order to reduce the detrimental effects on operational accuracy which are produced by roll of an aircraft. One solution which has been proposed utilizes apparatus in which the base of the antenna may be attached to a shaft pointing in the fore and aft direction of the aircraft. This shaft is supported on two bearings rigidly mounted in the aircraft structure. A servo mechanism controls the antenna so that its axis is maintained substantially in a vertical plane which extends longitudinally of the aircraft. (Unless otherwise indicated, the term "axis of the antenna," as employed herein, will be understood to mean an arbitrary reference line passing through the antenna in fixed relation thereto and which normally extends vertically, or in any event, is adapted to lie in the aforesaid vertical plane. It may constitute the spin axis of a continuously scanning antenna.) This method requires a radome of large dimensions to allow proper positioning of the antenna. "Radome," for the purpose of this specification, is defined as a turret for inclosing an antenna assembly. In some cases, full roll stabilization may not be obtainable because of lack of space for all required positions of the antenna.

An object of the present invention, therefore, is to provide an improved stabilizing apparatus which when associated with an aircraft will maintain the axis of an antenna substantially vertical or in a desired vertical plane for various degrees of roll of the aircraft without requiring excessively large radome space.

For a better understanding of the invention together with other and further objects thereof, reference is had to the following description taken in connection with the accompanying drawings in which:

Fig. 1 is a rear elevational view of the stabilizing apparatus as it appears when there is no roll of the aircraft;

Fig. 2 is a view similar to Fig. 1 but showing the apparatus as it appears during roll of the aircraft;

Figure 3:
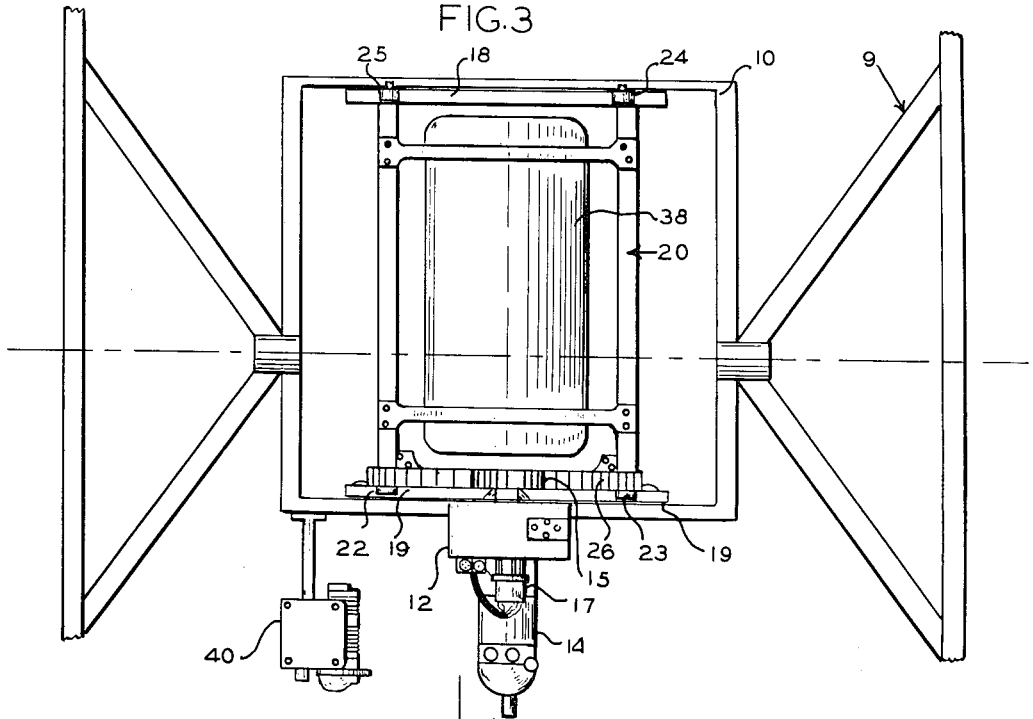
Fig. 3 is a plan view of the stabilizing appartus.

Referring more particularly to Fig. 1, there is shown a stabilizing apparatus which includes a frame 9 adapted to be attached to an aircraft structure. A supporting structure 10 is suitably connected to the frame 9. A stabilizing mechanism 12 is rigidly mounted on the supporting structure 10. The mechanism 12 comprises a driving motor 14 which is mechanically connected to a gear or pinion 15. The mechanical connection is indicated by the broken line 16 and may comprise any suitable train of gears. A rotary control transformer 17, preferably of the type known as "synchro," is associated with the mechanism 12 to furnish a voltage for driving the motor 14 as will be described later in the operation of the servo system. The stator of the rotary control transformer 17 is rigidly mounted on the structure of the mechanism 12, and the rotor (not shown) of the control transformer 17 is suitably coupled with the train of gears 16.

A plurality of circular track portions, preferably two, 18 and 19, more clearly shown in Fig. 3, are rigidly mounted on the supporting structure 10. A movable structure 20 shown in Fig. 3 carries a plurality of rollers, preferably four pairs respectively designated 22, 23, 24, and 25, which cooperate with the circular tracks 18 and 19 whereby the supporting structure 10 supports the movable structure 20 in such a manner that the position of the movable structure 20 may be changed with respect to the supporting structure 10. If desired, additional rollers may be provided to prevent yaw of the structure 20. A gear sector or arcuate rack 26 is so connected to the movable structure 20 as to mesh with gear 15 so that when gear 15 rotates, the movable structure 20 will be moved along the circular track portions 18 and 19 to a desired position.

An antenna 27 which may include a parabolic reflector, for example, is suitably connected to the movable structure 20 and is housed in a radome, the outline of which is indicated by the broken line 28, Fig. 1. Preferably the arc of the gear sector 26 has a radius 42, measured from the center of the antenna 27, equal to the distance 41 from the center to the farthest point of the antenna, as indicated in Fig. 1. The movable structure 20, Fig. 3, may house the driving means (not shown) for spinning the antenna 27 in those applications involving the use of a continuously rotating antenna.

Figure 5:
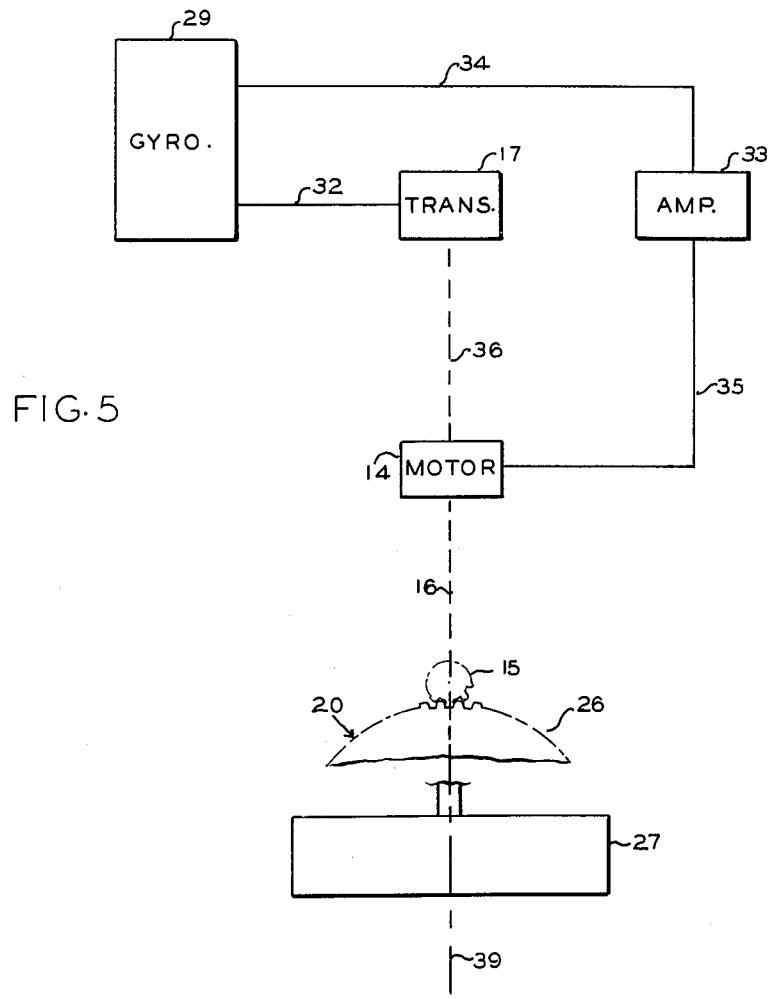
Fig. 5 is a block diagram of the servo system used with the stabilizing apparatus.

Fig. 5 shows a block diagram of a servo system which may provide a driving means for carrying out the stabilization of the antenna 27 through the medium of its supporting structure. A gyroscope 29 is rigidly mounted on the supporting structure 10, this gyroscope having a "takeoff" or synchro generator embodied therein as is well known in the art. This generator and the control transformer 17 are energized by a suitable alternating-current source. The gyro takeoff provides an electrical output which is a function of the roll of the aircraft. The gyro 29 is electrically connected to the rotary control transformer 17, as schematically shown by a line 32, and also to a servo amplifier 33 by line 34. The servo amplifier 33 rectifies and amplifies the alternating-current output of the gyro 29, and the resulting direct-current voltage is impressed on the driving motor 14 through a line 35 as shown. The rotors of the control transformer 17 and the motor 14 are interconnected so as to move simultaneously, the mechanical connection being indicated by the dotted line 36. The remaining parts shown in Fig. 5 have been described hereinabove.

The operation of the stabilizing apparatus will be described with reference to Figs. 1, 2 and 5. It will be assumed that the axis 39 (which may constitute the spin axis of the antenna 27) is to be maintained in a vertical plane that extends longitudinally of the aircraft. When the aircraft rolls, the rotor of the control transformer 17 tends to occupy a position with respect to its stator which differs from the position assumed by the rotor of the gyro takeoff relative to its own stator. As a result of this action there is induced in the takeoff a voltage which is applied to the servo amplifier-motor combination 33 and 14. The servo system is so arranged that it operates in response to this applied voltage to move the antenna 27 and the associated rotor of the control transformer 17 in a direction to reduce the voltage impressed upon the motor 14. The voltage is reduced to zero when the rotors of the gyro takeoff and the rotary control transformer 17 occupy corresponding positions in relation to their respective stators. When this occurs, the axis 39 of antenna 27 will have been oriented in the desired manner relative to the aforesaid vertical reference plane.

Figure 4:
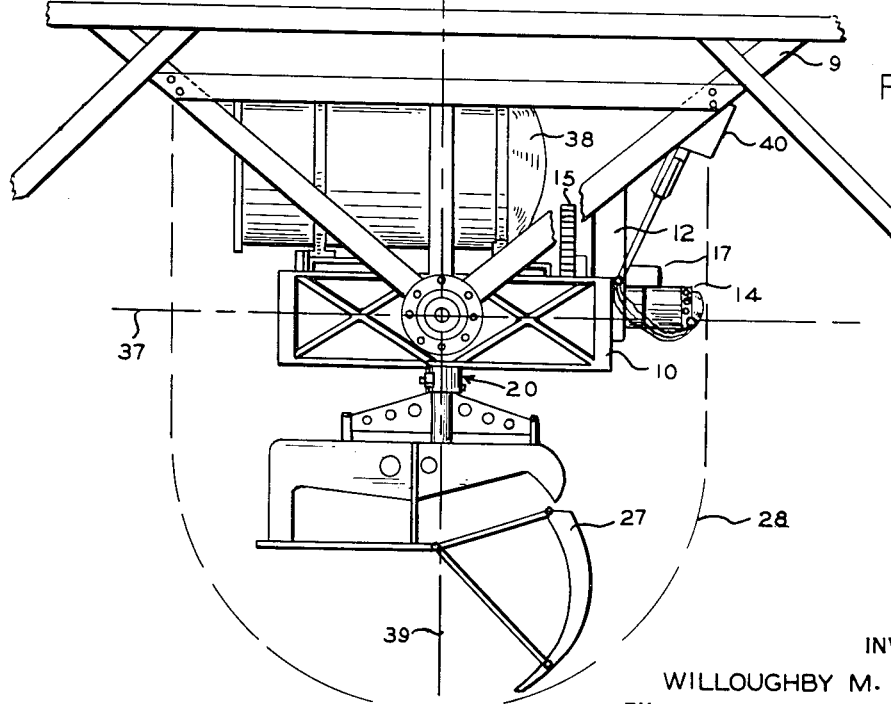
Fig. 4 is a side elevational view of the stabilizing apparatus.

It may be assumed that the longitudinal axis of the aircraft during an object-locating operation will normally be maintained horizontal, since such operations require level flight. If desired, however, a manually operated pitch stabilizing mechanism 40, Figs. 1 and 4, may be connected between the frame 9 and the supporting structure 10 to correct for slow deviations in the pitch angle of the aircraft. Referring to Fig. 4, the axis 37 may be an arbitrary line passing through the supporting structure 10 longitudinally of the aircraft. The axis 37 may be maintained substantially horizontal by varying the position of the supporting structure 10 with respect to the frame 9 through manual adjustment of the pitch stabilizing mechanism 11. This adjustment, in conjunction with the roll stabilization feature described above, serves to maintain the axis 39 of the antenna substantially vertical, thus affording what is known as platform stabilization.

The radio-frequency head 38 which comprises those components of the transmitter and receiver that may be supplied with electric power through ordinary cables, may be mounted on the movable structure 20. The only radio-frequency transmission line needed will be that between the head 38 and the antenna 27, and only one rotating radio-frequency joint will be required.

The invention here disclosed is advantageous in that the supporting and driving apparatus for the antenna 27 is able to maintain the radiation beam of the antenna 27 in substantially a normal position independent of the roll or pitch angle of the aircraft. It should be noted particularly that there is very little movement of the center of the antenna relative to the radome and that the space required for clearance of the antenna in the radome is held to a minimum.

Further advantages of the invention are that the supporting apparatus will hold the antenna rigid and not introduce additional vibrations; only one rotating radio frequency joint will be required; and there is no distortion introduced on the indicators due to the roll and pitch of the aircraft, eliminating the need for correction thereof.

While there has been described what is at present considered the preferred embodiment of the invention, it will be obvious to those skilled in the art that various changes and modifications may be made therein without departing from the spirit of the invention.

What is claimed is:

In combination with an airborne radio object-locating system including an antenna having an axis adapted to lie normally in a vertical plane which extends longitudinally of an aircraft, roll stabilizing apparatus comprising a supporting structure attached to the aircraft, a single second structure movable relative to said supporting structure, said antenna being carried by said second structure, a plurality of curved tracks on said supporting structure, a plurality of rollers on said second structure cooperating with said tracks to support and guide said second structure, power-operated means carried by said supporting structure, a gear sector forming an arc lying on a circle whose center is the center of said antenna, said sector being fixedly mounted upon said second structure, gear means interconnecting said power-operated means and said gear sector, electrical means controlling said power-operated means, means automatically responsive to roll of the aircraft for operating said electrical means in accordance with the amount of such roll, said power-operated means being arranged to operate under control of said electrical means for positioning said second structure through the medium of said gear means and gear sector thereby to maintain said antenna axis substantially in said vertical plane irrespective of the roll of the aircraft, and manual pitch stabilizing means mounted on said supporting structure for adjusting the position thereof to correct for the pitch angle of said aircraft.

References Cited in the file of this patent

UNITED STATES PATENTS

| | | |
|---|---|---|
| 1,525,783 | Trenor | Feb. 10, 1925 |
| 2,182,658 | Chilton | Dec. 5, 1939 |
| 2,203,852 | Wells | June 11, 1940 |
| 2,288,102 | Meredith | June 30, 1942 |
| 2,369,622 | Toulon | Feb. 13, 1945 |
| 2,407,275 | Hays | Sept. 10, 1946 |
| 2,415,679 | Edwards et al. | Feb. 11, 1947 |
| 2,415,680 | Hoyt | Feb. 11, 1947 |
| 2,417,086 | Proskauer | Mar. 11, 1947 |

FOREIGN PATENTS

| | | |
|---|---|---|
| 485,822 | Great Britain | May 25, 1938 |